(No Model.)
LE VANT O. HALL.
PISTON PACKING.
No. 287,669. Patented Oct. 30, 1883.
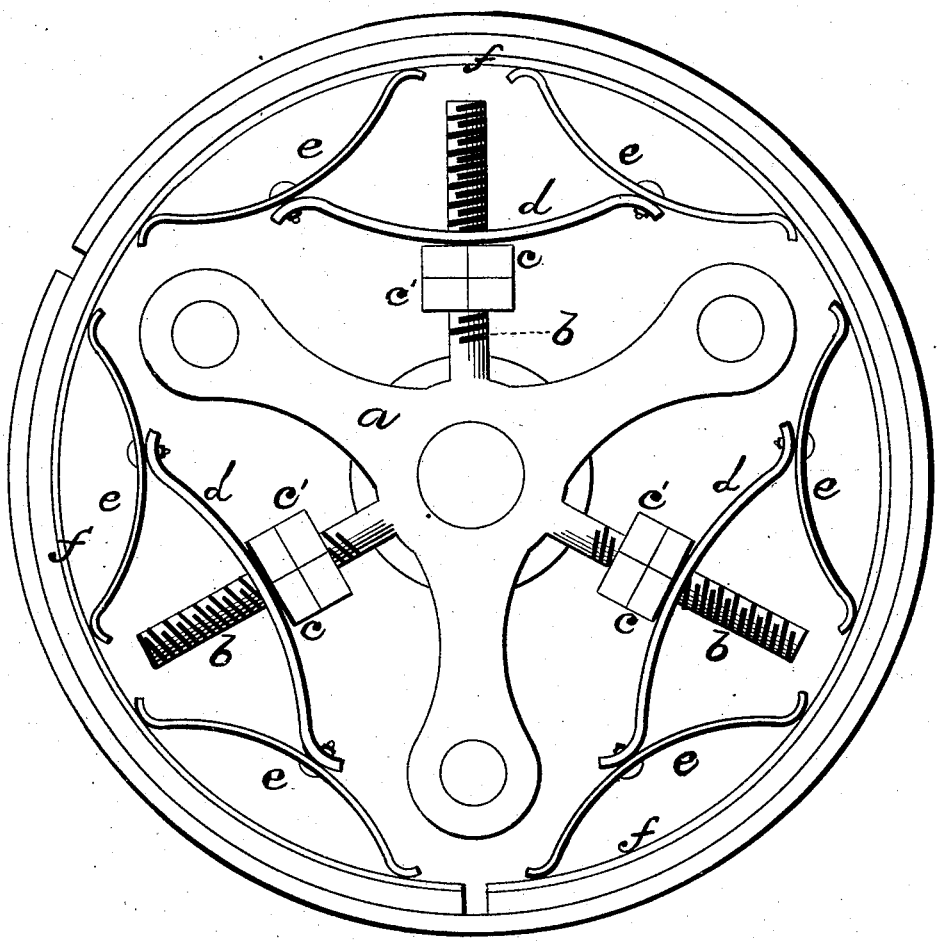
WITNESSES
E. H. Bates.
John T. Morrow
INVENTOR
Le Vant O. Hall
by Anderson & Smith
his ATTORNEYS

UNITED STATES PATENT OFFICE.

LE VANT O. HALL, OF BUCHANAN, MICHIGAN.

PISTON-PACKING.

SPECIFICATION forming part of Letters Patent No. 287,669, dated October 30, 1883.

Application filed August 10, 1883. (No model.)

*To all whom it may concern:*

Be it known that I, LE VANT O. HALL, a citizen of the United States, residing at Buchanan, in the county of Berrien and State of Michigan, have invented certain new and useful Improvements in Piston-Packing; and I do declare the following to be a full, clear, and exact description of the invention, such as will enable others skilled in the art to which it appertains to make and use the same, reference being had to the accompanying drawing, and to letters or figures of reference marked thereon, which form a part of this specification.

The figure of the drawing is a plan view of the piston-packing.

This invention has relation to piston-heads; and it consists in the construction and arrangement, in connection with the packing-rings, of the steel springs within the head to equalize the expansion and prevent cutting of the cylinder when the engine is run by inexperienced hands, as will be hereinafter fully described, and particularly pointed out in the claim appended.

Referring by letter to the accompanying drawing, $a$ designates the casting on the end of the piston-rod, to which the piston-heads are secured, and $b$ designates the threaded studs projecting therefrom at the edges between the arms of the casting. These studs are provided with double nuts $c\ c'$, and are three in number, as shown.

$d\ d\ d$ designate three convex lateral springs, which are provided at each end with an auxiliary convex spring, $e$, of smaller dimensions. The convexities of the springs lie toward the axis of the piston-head. The ends of the auxiliary springs $e$ rest directly against the inner packing-ring, $f$, and the lock-nuts $c\ c'$ are turned down upon the middle portions of the main or connecting springs $d\ d\ d$, and expand all of the springs, causing the ends of the auxiliary springs to bear at twelve different points against the ring $f$, thereby equalizing the expansion of the packing-rings. This method of applying the springs over the single elliptic spring possesses the advantage of having about three times the elasticity of the single spring, and more bearings are provided, and the pressure is distributed more evenly on all parts of the rings and cylinder, and, owing to the increased elasticity, the piston-head is not so liable to cut the cylinder when the engine is run by inexperienced hands.

The auxiliary springs are secured to the main springs by nut-bolts.

Having thus fully described my invention, what I claim as new, and desire to secure by Letters Patent, is—

In a piston-head, the combination, with the casting provided with the threaded studs $b\ b\ b$ and lock-nuts $c\ c'$, of the convex springs $d\ d\ d$, provided at their ends with the auxiliary springs $e$, bearing against the inner ring, $f$, and held in place by the lock-nuts bearing upon the springs $d\ d\ d$, substantially as specified.

In testimony whereof I affix my signature in presence of two witnesses.

LE VANT O. HALL.

Witnesses:
W. A. PALMER,
A. A. WORTHINGTON.